United States Patent
Tripod

(10) Patent No.: US 6,297,602 B1
(45) Date of Patent: Oct. 2, 2001

(54) HIGH VOLTAGE REGULATION BY SWITCHING RETRACE CAPACITORS

(75) Inventor: Luc Tripod, Zurich (CH)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 09/297,488

(22) PCT Filed: Nov. 12, 1997

(86) PCT No.: PCT/IB97/01427

§ 371 Date: Apr. 29, 1999

§ 102(e) Date: Apr. 29, 1999

(87) PCT Pub. No.: WO98/21882

PCT Pub. Date: May 22, 1998

(30) Foreign Application Priority Data

Nov. 13, 1996 (GB) .................................. 9623611

(51) Int. Cl.[7] ................................................ H01J 29/70
(52) U.S. Cl. ................................................ 315/411; 315/408
(58) Field of Search ........................... 315/370, 399, 315/411, 364, 366, 403, 225, 291, 379, 408, 369, 5.33; 363/20–23, 56

(56) References Cited

U.S. PATENT DOCUMENTS

| | | | |
|---|---|---|---|
| 3,706,023 | 12/1972 | Yamada et al. | 321/2 |
| 4,041,355 | * 8/1977 | Onodera | 315/411 |
| 4,223,251 | 9/1980 | Haferl | 315/370 |
| 4,368,409 | * 1/1983 | Sivanesan et al. | 315/411 |
| 4,885,673 | * 12/1989 | Philippe | 363/21 |
| 4,939,429 | * 7/1990 | Rodriguez-Cavazos | 315/411 |
| 5,276,604 | * 1/1994 | Messman | 363/65 |
| 5,331,532 | * 7/1994 | Iwai et al. | 363/20 |
| 5,357,175 | 10/1994 | Kamada et al. | 315/411 |
| 5,418,705 | * 5/1995 | Smith et al. | 363/56 |
| 5,561,354 | * 10/1996 | Simons et al. | 315/408 |
| 5,627,437 | * 5/1997 | Kim | 315/399 |
| 5,982,641 | * 11/1999 | Jackson | 363/21 |

FOREIGN PATENT DOCUMENTS

| | | | |
|---|---|---|---|
| 128223 | 12/1984 | (EP) | 3/18 |
| 59044177 | * 3/1984 | (JP) | 3/18 |
| 59-044177 | 3/1984 | (JP) | 3/18 |
| 59-171366 | 9/1984 | (JP) | 3/22 |
| 0952731 A2 | * 10/1999 | (JP) | 3/185 |

OTHER PUBLICATIONS

*Patent Abstracts of Japan, vol. 009, No. 027, Feb. 6, 1985 & JP 59-171366.
** Patent Abstracts of Japan, vol. 008, No. 135, Jun. 22, 1984 & JP 59-044177.

* cited by examiner

Primary Examiner—Don Wong
Assistant Examiner—Trinh Vo Dinh
(74) Attorney, Agent, or Firm—Joseph S. Tripoli; Harvey D. Fried; Francis A. Davenport

(57) ABSTRACT

A circuit for regulating an anode voltage in an information display apparatus. A horizontal deflection circuit has trace and retrace modes of operation. The horizontal deflection circuit further has a fixed retrace capacitance; and a series combination of a switched retrace capacitance and a switch element, which combination is coupled in parallel with the fixed retrace capacitance. The switch element is in a closed position as the horizontal deflection circuit enters the retrace mode of operation. A voltage divider network samples the anode voltage. A control circuit is responsive to the sample voltage for controlling the switch element, such that the control circuit effects regulation of the anode voltage by selecting a time during the retrace period at which to place the switch element in an open position. The control circuit may also provide a raster width compensation voltage for an east-west pincushion correction circuit.

11 Claims, 3 Drawing Sheets

HIGH VOLTAGE REGULATION BY SWITCHING RETRACE CAPACITORS

BACKGROUND

Field Of The Invention

This invention relates generally to the field of high voltage regulation in an information display apparatus, and, in particular, to regulating the anode voltage in an information display apparatus that utilizes a cathode ray tube.

Background Information

In today's multimedia environment, it becomes increasingly desirable to use a single information display apparatus for several different applications.

For example, in addition to displaying video information, a television receiver can currently be used to display teletext information. Most recently, manufacturers of computers and consumer electronics have begun to offer products wherein the television receiver is also used to display information provided by a computer, such as text pages, high resolution graphics, and the like.

These different applications demand increased performance from the deflection and high voltage circuits of the information display apparatus. For instance, in the display of video information, the information display apparatus is required to provide a dark screen and must be capable of a high beam current and a high anode voltage. The use of the same information display apparatus to display high resolution graphics of the type typically associated with a color display monitor additionally requires that the information display apparatus provide a stable raster size, good focus, and a small spot size. These additional requirements, in turn, depend upon the presence of a well-regulated anode voltage for the cathode ray tube.

One approach is provided by U.S. Pat. No. 5,357,175, which discloses regulating the anode voltage by varying the B+ voltage responsive to variations in the anode voltage. This document also discloses providing an error signal generated from the anode voltage to a horizontal amplitude correction circuit 54 for regulating a pincushion correction voltage. Another approach to regulating the anode voltage for the cathode ray tube is provided by European Patent Application 0 128 223 A1, which discloses a flyback period control circuit 1 that switches a resonating capacitor Ct' into and out of a horizontal deflection circuit only during the flyback period TR. In this way, the flyback period control circuit 1 controls the flyback period TR to control the high voltage HV.

SUMMARY

The present invention is directed to a high voltage regulation circuit that provides a well-regulated anode voltage for the cathode ray tube of the information display device.

A circuit for regulating an anode voltage in an information display apparatus comprises: a horizontal deflection circuit having trace and retrace modes of operation; the horizontal deflection circuit further having a fixed retrace capacitance and a series combination of a switched retrace capacitance and a switch element, the series combination coupled in parallel with the fixed retrace capacitance, wherein the switch element is in a closed position as the horizontal deflection circuit enters the retrace mode of operation; a voltage divider network for providing a sample voltage indicative of a magnitude of the anode voltage; and a control circuit responsive to the sample voltage for controlling the switch element, such that the control circuit effects regulation of the anode voltage by selecting a time during the retrace period at which to place the switch element in an open position.

The above, and other features, aspects, and advantages of the present invention will become apparent from the following description read in conjunction with the accompanying drawings, in which like reference numerals designate the same elements.

DESCRIPTION OF THE PREFERRED EMBODIMENTS

Figure 1:
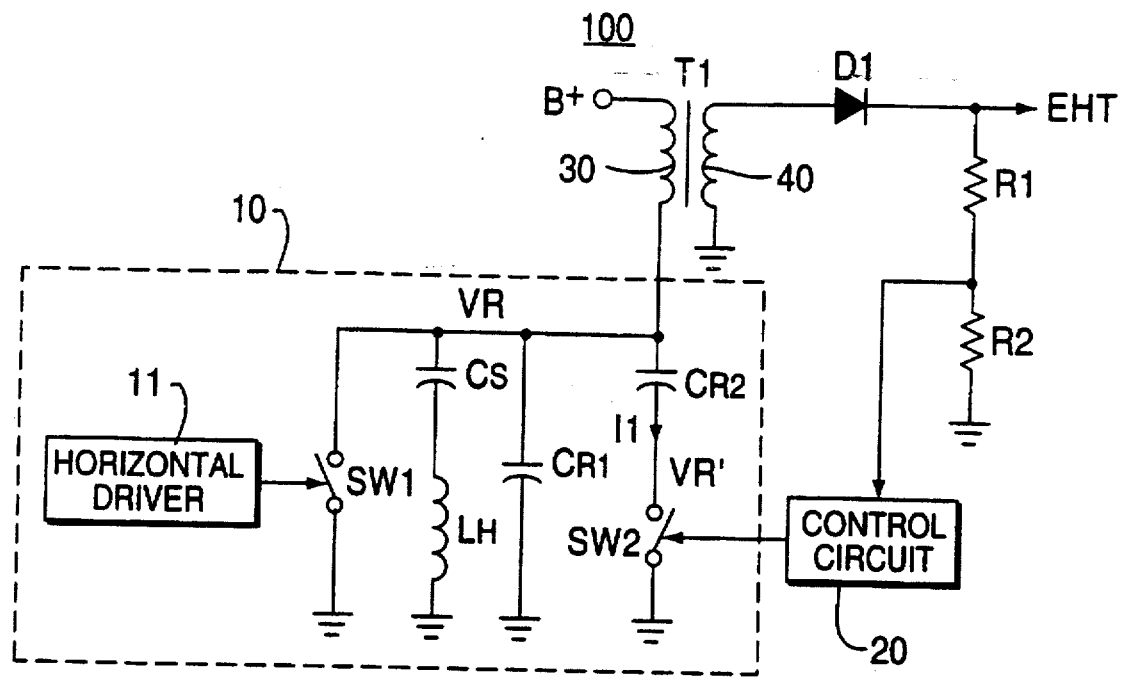
FIG. 1 is a block diagram of a high voltage regulation circuit that embodies the present invention.
Figure 3A:
FIGS. 3a–3d show voltage and current waveforms useful for explaining the operation of the high voltage regulation circuit of FIGS. 1 and 2.

FIG. 1 illustrates the principle of operation of the inventive high voltage regulation circuit 100. A horizontal deflection circuit 10 deflects the electron beam across the screen of the cathode ray tube to form a raster. A retrace voltage VR from the horizontal deflection circuit 10 is used to produce the high-voltage anode voltage EHT required by the cathode ray tube. The retrace voltage VR is shown in FIG. 3a; the retrace voltage VR typically has a substantially sinusoidal shape at a low load, or low beam current, condition. This substantially sinusoidal shape is slightly deformed when the retrace voltage VR is subjected to a high load, or high beam current, condition. In FIGS. 3a–3d a dashed line indicates a high load, or high beam current, condition and a solid line indicates a low load, or low beam current, condition.

A sample of the anode voltage EHT is used by the control circuit 20 to determine the precise instant at which the switch element SW2 should be placed in the open position. For example, the control circuit 20 opens the switch element SW2 sooner if the anode voltage EHT drops below a predetermined level; conversely, the control circuit 20 opens the switch element SW2 later if the anode voltage EHT exceeds the predetermined level. In this manner the anode voltage EHT can be precisely regulated.

Figure 2:
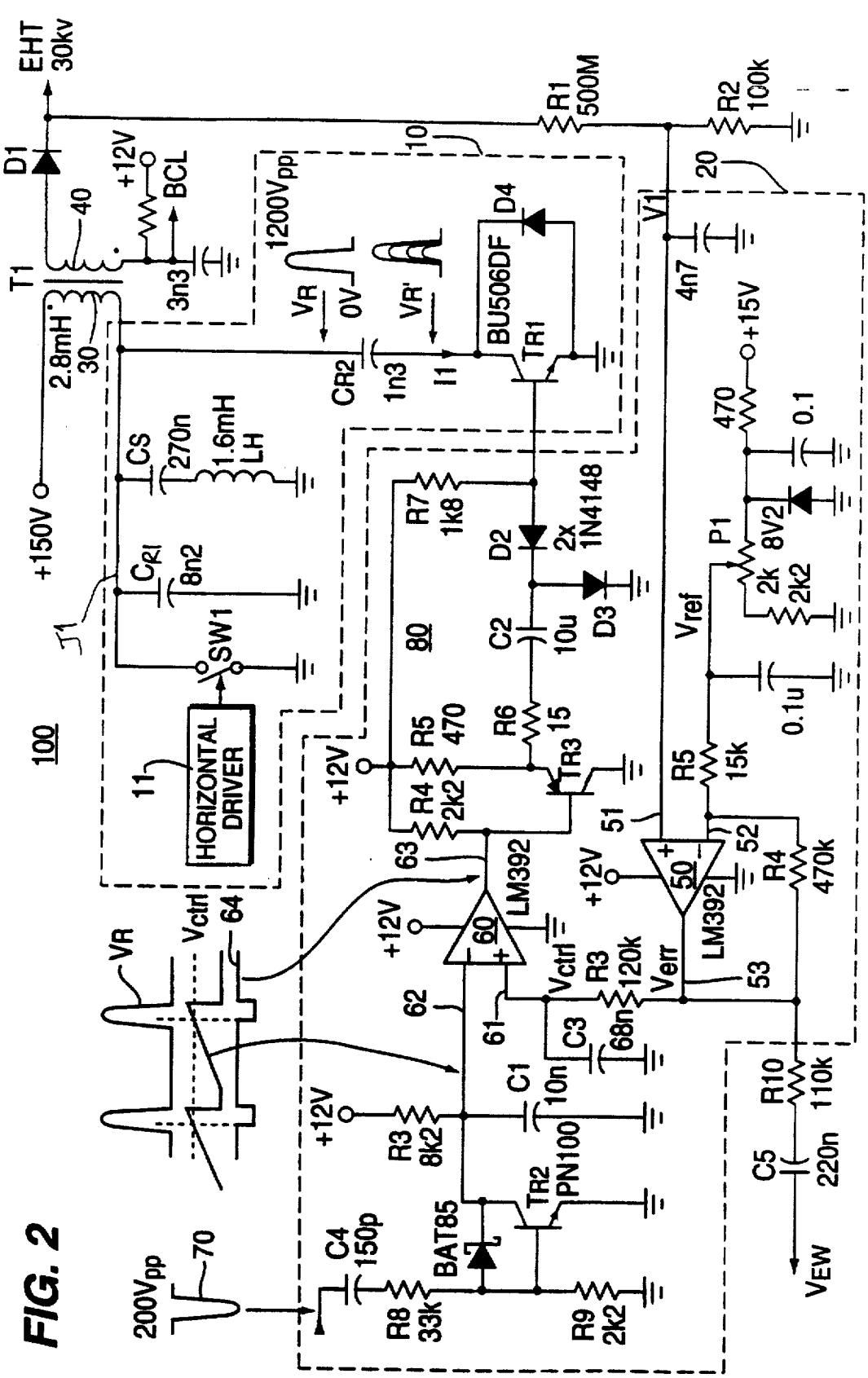
FIG. 2 is a schematic diagram of the high voltage regulation circuit of FIG. 1.

FIG. 2 shows a schematic representation of an exemplary embodiment of the high voltage regulation circuit 100. The horizontal deflection circuit 10 is formed by the horizontal drive 11, the switch element SW1, the S-shaping capacitance CS, the horizontal deflection yoke LH, the fixed retrace capacitance CR1, and the retrace capacitance CR2 switched by switch element TR1 (shown as SW2 in FIG. 1). For purposes of the present description the switch element TR1 is initially closed so that the retrace capacitances CR1 and CR2 are in parallel; thus, the effective retrace capacitance is the sum of the two retrace capacitances. The horizontal driver circuit 11 may be a conventional type that is well-known to those having ordinary skill in the art and will not be described further.

The horizontal driver circuit 11 controls the operation of the switch element SW1 at a horizontal-rate frequency to periodically deflect an electron beam from a left edge of the screen to a right edge of the screen (from the perspective of one viewing the screen). The switch element SW1 typically consists of an npn-type bipolar junction transistor coupled in parallel with a diode, such that the cathode of the diode is coupled to the collector electrode of the transistor, and the emitter electrode of the transistor and the anode of the diode are coupled to the ground, or reference, potential. During the period of time that switch SW1 is in a closed position, also referred to as the "trace" period, the electron beam is deflected from the left edge of the screen to the right edge of the screen by virtue of the resonant interaction of the S-shaping capacitance CS and the horizontal deflection yoke LH. During this trace period the retrace voltage VR at the junction J1 of the S-shaping capacitor CS and the retrace capacitances CR1 and CR2 is substantially equal to the ground, or reference, potential.

In the period between subsequent trace periods, also referred to as the "retrace" period, the switch element SW1 is in an open position and the electron beam is returned from the right edge of the screen to the left edge of the screen by virtue of the resonant interaction of the horizontal deflection yoke LH and the retrace capacitances CR1 and CR2. During this retrace period the retrace voltage VR at the junction has a substantially sinusoidal shape, as shown in FIG. 3a, and a peak magnitude that is equal to approximately 1200 V for the exemplary embodiment of FIG. 2.

The retrace voltage VR is coupled through a primary winding 30 of transformer T1 to a secondary winding 40, where it is rectified by the diode D1 to produce an anode voltage EHT for the cathode ray tube. The anode voltage is a high voltage and is equal to approximately 30 kV for the exemplary high voltage regulation circuit 100 of FIG. 2.

The regulation of the anode voltage EHT occurs as follows. The anode voltage EHT is sampled by a sampling network to provide a sample voltage V1. In FIG. 2, the sampling network is implemented by a voltage divider network. The anode voltage EST is divided by the voltage divider formed by the resistors R1 and R2 to provide the sample voltage V1, which is applied to the non-inverting input 51 of the error amplifier 50. The sample voltage V1 is compared against a reference voltage Vref that is applied to the inverting input 52 of the error amplifier 50. The error voltage Verr obtained by subtracting the reference voltage Vref from the sample voltage V1 is amplified and provided at the output 53 of the error amplifier 50. The gain of the error amplifier 50 is determined by the ratio of the resistor R4 to the resistor R5. This ratio also affects the output impedance of the high voltage regulation circuit, which, for the exemplary embodiment of FIG. 2, is equal to approximately 150 kΩ.

This error voltage Verr, which directly tracks the anode voltage EHT, is low-pass filtered by the combination of the resistor R3 and the capacitor C3 to produce a control voltage Vctrl, which is applied to the non-inverting input 61 of a comparator 60. In the exemplary embodiment shown in FIG. 2, it has been experimentally determined that the high voltage regulation circuit 100 performs best when the low-pass filter formed by the resistor R3 and the capacitor C3 has a cut-off frequency equal to approximately 20 Hz. The choice of a particular cut-off frequency for this low-pass filter is specific to the component values used in each embodiment of the particular high voltage regulation circuit 100 and involves a trade-off between two competing demands placed on the filter. Typically, a higher cut-off frequency for this filter, and thus a faster response for the control loop of the high voltage regulation circuit, is undesirable. Because of coupling between the transformer T1, which is usually of the diode-split type, and the horizontal deflection circuit 10, there are typically phase and amplitude errors in a horizontal deflection current flowing through the deflection coil LH. These phase and amplitude errors cannot be effectively compensated if they occur too quickly. However, the high voltage regulation circuit should react quickly when the picture changes from dark to bright and vice versa. An acceptable choice for the cut-off frequency for the low-pass filter appropriately balances these competing requirements.

The inverting input 62 of the comparator 60 accepts a horizontal frequency ramp voltage Vramp which is generated by charging capacitor C1 through resistor R3. Capacitor C1 is discharged to ground through transistor TR2 by using a horizontal-rate waveform 70 to turn transistor TR2 on at a horizontal-rate frequency. The horizontal-rate waveform 70 may be provided by a secondary winding (not shown) of the transformer T1 and may thus have the same general shape, although inverted, as the retrace voltage VR at junction J1. In the exemplary embodiment of the high voltage regulation circuit 100 shown in FIG. 2, the horizontal-rate waveform 70 may have a peak-to-peak voltage equal to approximately 200 V. The waveform 70 is coupled to the base electrode of the transistor TR2 by a differentiator formed by a capacitor C4 and resistors R8 and R9. The values for the components of the differentiator are selected such that transistor TR2 turns on and discharges the capacitor C1 near the end of the retrace period.

The comparator 60 functions as a pulse-width modulator. The switch drive signal 64 at the output 63 of the comparator 60 remains at a high level until the ramp voltage Vramp exceeds the control voltage Vctrl; at that time, the switch drive signal 64 goes to a low level, as shown in FIG. 2. The control voltage Vctrl thus determines when the output signal transitions from a high state to a low state. For example, imagine that the anode voltage EHT exceeds the predetermined level, as represented by the reference voltage Vref. The error voltage Verr, and thus the control voltage Vctrl, will assume a level nearer the power supply voltage of the error amplifier 50, and the switch drive signal 64 will remain at a high state for a longer period of time, because of the relatively high threshold level set by the control voltage Vctrl. If, on the other hand, the anode voltage EHT is below the predetermined level, the error voltage Verr, and thus the control voltage Vctrl, will assume a level nearer ground, or the reference potential, of the error amplifier 50, and the output signal will remain at a high state for a shorter period of time, because of the now relatively low threshold level set by the control voltage Vctrl.

The switch drive signal 64 uses a low-current, high voltage driver circuit 80 to control the operation of the switch element TR1. For instance, at the start of the trace period, the switch drive signal 64 at the output 63 of the comparator 60 is at a high, as indicated by the waveform shown in FIGS. 2 and 3c. The magnitude of the high state of the switch drive signal 64 is equal to approximately the power supply voltage to the comparator 60. The transistor TR3, the base electrode of which is coupled to the comparator 60 and controlled by the switch drive signal 64, is thus off, and the capacitor C2 charges to the supply voltage potential through the path defined by the resistors R5 and R6, the capacitor C2, and the diode D3. The diode D2 is off, and the switch element TR1 is on by virtue of being coupled at its base electrode to the supply voltage potential through the resistor R7. The switched retrace capacitance CR2 is thus coupled in parallel to the fixed retrace capacitance CR1, so that the effective retrace capacitance is the sum of the fixed CR1 and switched CR2 retrace capacitances. Note that minimal power is dissipated by the switch element TR1 because the retrace voltage VR at junction J1 and a current I1 through the switch element TR1 are both equal to approximately zero during the trace period. The switch element TR1 may be a transistor having an industry part number BU506DF, which has an integrated body diode that is labeled D4 in FIG. 2. The switch element TR1 must have a voltage rating that is sufficiently high to enable switch element TR1 to withstand the peak magnitude of the retrace voltage VR.

Figure 3B:
Figure 3C:
Figure 3D:
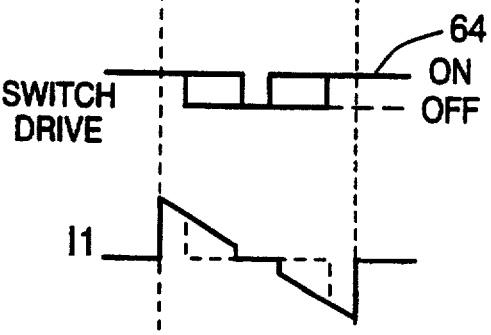

As the retrace period begins, the switch element TR1 is still on; the current I1 flows to ground through the switch element TR1, as indicated by the waveform shown in FIG. 3d, thereby charging the switched retrace capacitor CR2; and the ramp voltage Vramp approaches the control voltage Vctrl. The peak magnitude of the current I1 flowing through the switch element TR1 during the retrace period is only approximately 0.5 A, so power dissipation by the transistor is minimized. Once the ramp voltage Vramp exceeds the control voltage Vctrl, the switch drive signal 64 transitions from the level of the power supply voltage to the ground, or reference, potential. As indicated by the waveforms shown in FIGS. 3c and 3d, when this transition occurs is also a function of the condition of the load. This transition causes the transistor TR3 to turn on. The voltage at the junction of the cathode of the diode D2 and the anode of the diode D3 goes to a negative voltage. The diode D3 thus turns off and the diode D2 turns on, thereby turning off the switch element TR1. As a result, the switched retrace capacitor CR2 is no longer in parallel with the fixed retrace capacitor CR1, and the effective retrace capacitance is thus reduced and is equal to the fixed retrace capacitance CR1. The peak-to-peak magnitude of the retrace voltage VR at the junction J1 increases due to the decrease in the effective retrace capacitance. Consequently, the anode voltage rises toward the predetermined level as the retrace voltage VR, with its increased peak-to-peak magnitude, is coupled through the primary winding 30 of the transformer T1 to the secondary winding 40, and then rectified by the diode D1 to provide the anode voltage EHT.

When the switch element TR1 turns off, the flow of current I1 is interrupted, and the switched retrace capacitance CR2 maintains a constant charge and thus a fixed voltage drop. The voltage VR' at the collector electrode of the switch element TR1 tracks the retrace voltage VR during the retrace period by virtue of the fixed voltage drop across the switched retrace capacitance CR2, as indicated by the waveform shown in FIG. 3b. As indicated in FIG. 3b, the magnitude of the voltage VR' is also a function of the load condition. In the exemplary embodiment shown in FIG. 2, the voltage VR' may vary from approximately 100 V for 0 mA of beam current to approximately 500 V for 1.6 mA of beam current. The theoretical range for the voltage VR' is from approximately 0 V to approximately 1200 V, where approximately 1200 V is the peak value of the retrace voltage VR during the retrace period. The diode D4 clamps the collector electrode of the switch element TR1 to approximately the ground, or reference, potential if the voltage VR' attempts to go below the ground, or reference, potential. This allows switch element TR1 to switch at a zero voltage, further minimizing the power dissipated by the switch element TR1.

The inventive high voltage regulation circuit of FIG. 2 thus advantageously provides for precise control of the point during the retrace period at which the switch element TR1 will turn off to reduce the effective retrace capacitance of the horizontal deflection circuit 10. The point at which the switch element TR1 is turned off is made to be as close as possible to the beginning of the retrace interval in order to minimize power dissipation in the switch element TR1.

Additionally, the high voltage regulation circuit 100 also delivers a signal for more precise dynamic beam current compensation than is currently provided by conventional solutions. For instance, fast changes in the anode voltage EHT may not be well-regulated because of the particular the cut-off frequency chosen for the loop filter of the high voltage regulation circuit 100. Recall that the cut-off frequency of combination of the resistor R3 and the capacitor C3 in the high voltage regulation circuit 100 of FIG. 2 is equal to approximately 20 Hz. As a result, raster width compensation is still necessary, but only with respect to an AC component of such compensation.

Figure 4A:
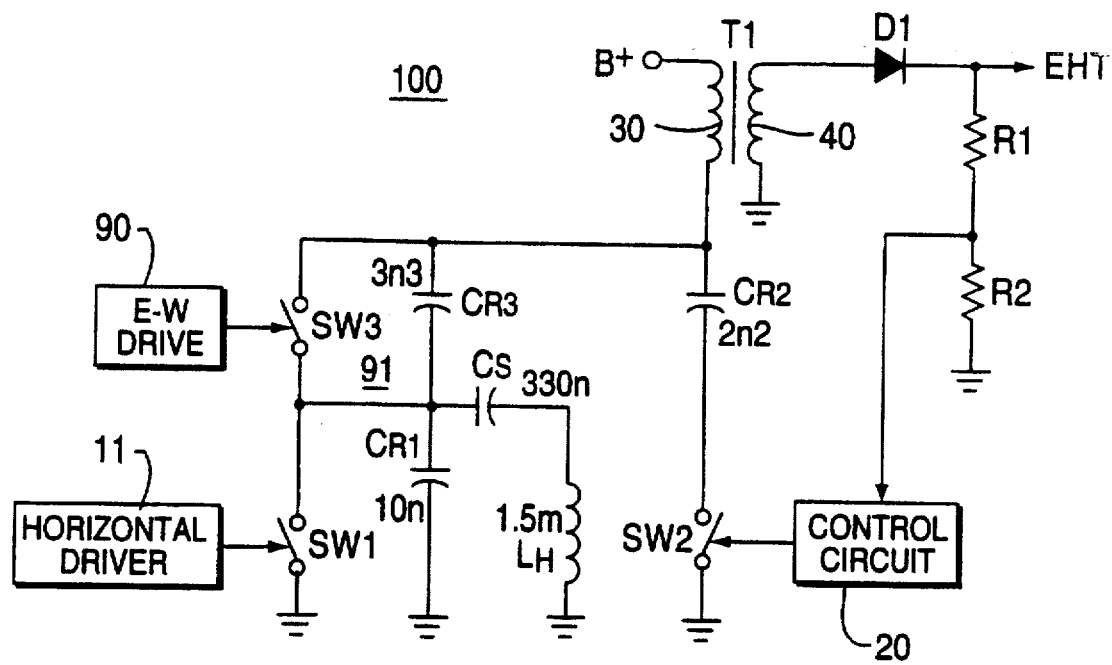
FIGS. 4a and 4b show, in block and schematic form, the high voltage regulation circuit in combination with different raster correction circuits of the information display apparatus.
Figure 4B:
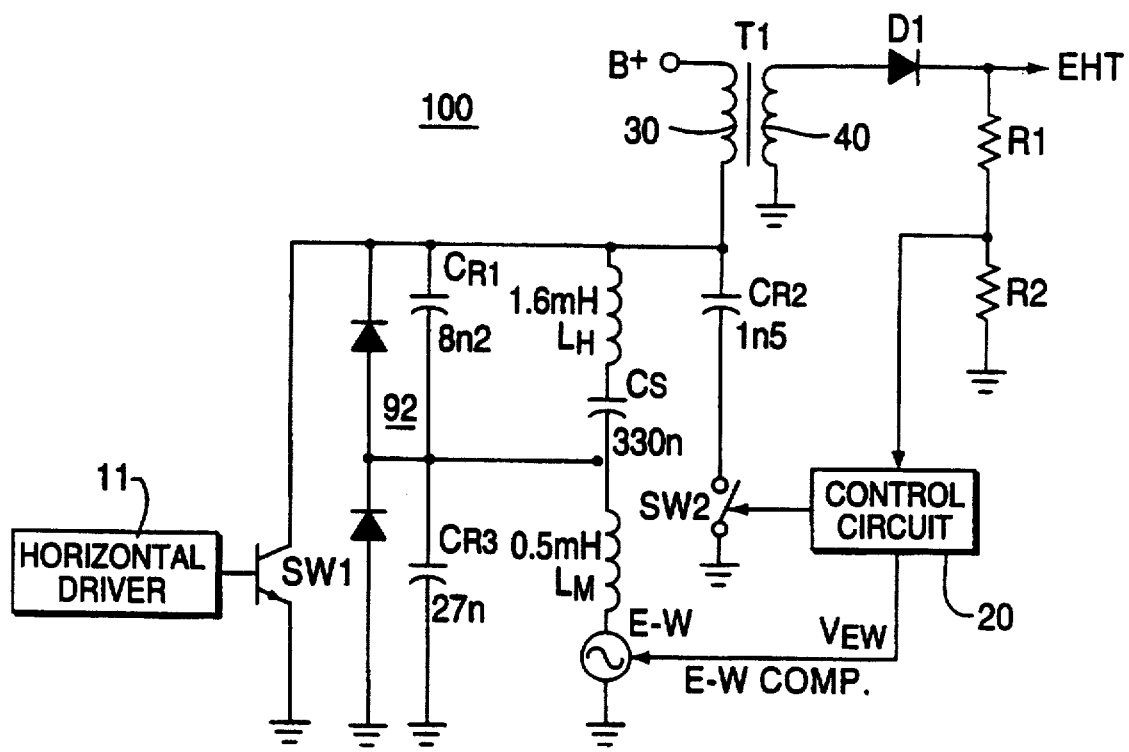

The high voltage regulation circuit shown in FIG. 2 advantageously provides for such correction. In a feature of the present invention, the output 53 of the error amplifier 50 is coupled to a particular East-West pincushion correction circuit by a resistor R10 and a DC blocking capacitor C5 to provide a raster width compensation voltage $V_{EW}$. The pincushion correction circuit need not be limited to a particular configuration. For example, referring to FIGS. 4a and 4b, the high voltage regulation circuit 100 of FIGS. 1 and 2 can be used in conjunction with a forward regulated output stage 91, as shown in FIG. 4a, or in conjunction with a diode modulator configuration 92, as shown in FIG. 4b. The E-W (East-West) drive 90 shown in FIG. 4a may be a conventional type that is well-known to those having ordinary skill in the art and will not be described further.

A conventional manner of providing information about the raster width to an East-West pincushion correction circuit is to use the voltage at the footpoint of the high voltage secondary winding of the transformer. For example, in the high voltage regulation circuit 100 shown in FIG. 2, the conventional approach would couple the point labeled BCL on the secondary winding 40 of the transformer T1 to the East-West pincushion correction circuit. Coupling the output 53 of the error amplifier 50 of the high voltage regulation circuit 100, rather than the voltage at the BCL point of the secondary winding 40, to the East-West pincushion correction circuit is a preferable approach because the error voltage Verr more precisely follows the anode voltage EHT than does the voltage at the BCL point of the secondary winding 40.

What is claimed is:

1. A circuit for regulating an anode voltage in an information display apparatus, said circuit comprising:
    a horizontal deflection circuit having trace and retrace intervals of operation;
    said horizontal deflection circuit comprising:
        a switched retrace capacitance;
        a switch element coupled in series with said switched retrace capacitance;
        a signal indicative of a magnitude of said anode voltage; and,
        a control circuit for varying said anode voltage in accordance therewith by closing said switch element from a first point during said trace interval and opening said switch element at a second point during said retrace interval controlled responsive to said signal.

2. The circuit of claim 1, wherein said control circuit opens said switch element at said second point responsive to a width modulated pulse generated to occur within said retrace interval.

3. The circuit of claim 2, wherein said anode voltage is increased when said second point occurs early in said retrace interval.

4. The circuit of claim 3, wherein said anode voltage is decreased when said second point occurs relatively later in said retrace interval.

5. The circuit of claim 4, wherein said first point occurs at the beginning of said trace interval.

6. The circuit of claim 1, wherein said switch element comprises a transistor.

7. The circuit of claim 6, wherein said transistor comprises a bipolar junction transistor.

8. The circuit of claim 1, wherein said signal is formed by a voltage divider network coupled to said anode voltage.

9. The circuit of claim 8, wherein said control circuit comprises an error amplifier for comparing said signal with a reference voltage to provide an error voltage indicative of a deviation of said anode voltage from a desired level.

10. The circuit of claim 9, wherein said error amplifier provides said error voltage to a modulated pulse width generator generating a switch control signal for said switching element, said switch control signal having a width responsive to said error voltage.

11. The circuit of claim 9, wherein said control circuit further comprises a low-pass filter coupled to an output of said error amplifier.

* * * * *